(12) United States Patent
Noronha et al.

(10) Patent No.: US 11,557,135 B2
(45) Date of Patent: Jan. 17, 2023

(54) SYSTEM AND METHOD TO DETERMINE THE AUTHENTICITY OF A SEAL

(71) Applicants: Paul Abner Noronha, Mumbai (IN); Gandhi Darshan Dhruman, Mumbai (IN); Nathani Murad, Mumbai (IN); Kamat Dattaprasad Narayan, Mumbai (IN)

(72) Inventors: Paul Abner Noronha, Mumbai (IN); Gandhi Darshan Dhruman, Mumbai (IN); Nathani Murad, Mumbai (IN); Kamat Dattaprasad Narayan, Mumbai (IN)

(*) Notice: Subject to any disclaimer, the term of this patent is extended or adjusted under 35 U.S.C. 154(b) by 0 days.

(21) Appl. No.: 17/403,055

(22) Filed: Aug. 16, 2021

(65) Prior Publication Data
US 2022/0319210 A1 Oct. 6, 2022

(30) Foreign Application Priority Data
Mar. 30, 2021 (IN) .............................. 202121014439

(51) Int. Cl.
*B65D 5/42* (2006.01)
*G06V 10/44* (2022.01)
(Continued)

(52) U.S. Cl.
CPC .............. *G06V 20/95* (2022.01); *G06V 10/44* (2022.01); *G06V 10/757* (2022.01); *G06V 30/10* (2022.01); *B65D 5/4233* (2013.01)

(58) Field of Classification Search
None
See application file for complete search history.

(56) References Cited

U.S. PATENT DOCUMENTS

| 6,067,374 | A  | * | 5/2000 | Fan ........................ G07D 7/206 382/209 |
| 9,030,321 | B2 | * | 5/2015 | Breed ..................... B60T 1/067 455/39 |

(Continued)

*Primary Examiner* — Soo Shin

(57) ABSTRACT

In one aspect, a computerized method for anti-counterfeiting solution using a machine learning (ML) model includes the step of providing a pre-defined set of feature detection rules, a pre-defined set of edge detection rules, a pre-defined threshold percentage, an original seal, an original fingerprint of the original seal, and a pre-trained fingerprint identification model. The pre-trained fingerprint identification model is trained by a specified ML algorithm using one or more digital images of the original seal. With a digital camera of a scanning device, the method scans a seal whose authenticity is to be determined. The seal is used to secure a transportation container. The method uses the pre-defined set of feature detection rules to detect and extract an extracted feature image at a specified position on the seal. The method breaks down the extracted feature image of the seal into a 'kn' number of sub-images by forming a 'k' rows x 'n' columns of a grid of the extracted feature image. The method implements the pre-defined set of edge detection rules to extract an edge structure of at least one object in each of the 'kn' number of sub-images. The method generates a set of unique fingerprints by specified steps. The method includes generating a unique fingerprint corresponding to a unique number or a feature based on each extracted edge structure. For the set of unique fingerprints, the method generates a match percentage for the set of unique fingerprints using the pre-trained fingerprint identification model. The match percentage corresponds to a matching proportion between each unique fingerprint generated for the seal being verified and the original fingerprint of the original seal on which the pre-trained fingerprint identification model is trained.

16 Claims, 11 Drawing Sheets

(51) Int. Cl.
  *G06V 10/75* (2022.01)
  *G06V 20/00* (2022.01)
  *G06V 30/10* (2022.01)

(56) References Cited

U.S. PATENT DOCUMENTS

| | | | | |
|---|---|---|---|---|
| 2003/0108232 A1* | 6/2003 | Yang | .................... | G06V 30/18 |
| | | | | 382/135 |
| 2015/0254961 A1* | 9/2015 | Brandl | ................ | H04B 5/0037 |
| | | | | 340/663 |
| 2017/0363673 A1* | 12/2017 | Mukherjee | ......... | G06K 19/0717 |
| 2018/0350180 A1* | 12/2018 | Onischuk | ............... | G07C 13/00 |

* cited by examiner

SYSTEM AND METHOD TO DETERMINE THE AUTHENTICITY OF A SEAL

CLAIM OF PRIORITY

The application claims priority under the Paris Convention for Indian patent application no. 202121014439 filed on 2021 Mar. 30 and titled A SYSTEM AND METHOD TO DETERMINE THE AUTHENTICITY OF A SEAL. This application is hereby incorporated by reference in its entirety.

FIELD OF INVENTION

The present disclosure relates generally to the field of machine learning and computer vision. More particularly, the present disclosure relates to determining the authenticity of a seal.

BACKGROUND

It is noted that plastic seals may be used to mechanically secure/seal transport boxes, containers, vehicle doors, trucks, trailers, warehouses, and the like. These seals can be designed to be used only once and designed to leave visual evidence of any tampering attempt. Each seal may have a unique serial number that is used to identify the seal. However, a skilled counterfeiter may completely replace a plastic seal with a duplicate seal rather than attempt to tamper with it. The counterfeiter may do this by creating a copy of an original seal and reprint this unique serial number on the copy (e.g. with a duplicate seal).

Currently, there exists no means to detect such counterfeiting or identify whether a seal is an original seal or a duplicate seal. In order to overcome the above-mentioned problem of the prior art, the present disclosure envisages a system and method to determine the authenticity of a seal. Current printing technologies such as, Continuous Ink Jet, Thermal Ink Jet, Thermal Transfer Offset, Laser printers, Gravure printers etc. have a limit on the resolution that can be achieved. This translates to minor differences to each print of the same artwork. These differences are there due to a number of reasons including but not limited to the printing technology used, the substrate material porosity and surface finish, vibrations on the printing line etc. These differences mean each print can be uniquely identified by its Fingerprint. The system and method of the present disclosure use this fingerprint to uniquely identify original seals and distinguish them from the duplicate seals.

SUMMARY OF THE INVENTION

In one aspect, a computerized method for anti-counterfeiting solution using a machine learning (ML) model includes the step of providing a pre-defined set of feature detection rules, a pre-defined set of edge detection rules, a pre-defined threshold percentage, an original seal, an original fingerprint of the original seal, and a pre-trained fingerprint identification model. The pre-trained fingerprint identification model is trained by a specified ML algorithm using one or more digital images of the original seal. With a digital camera of a scanning device, the method scans a seal whose authenticity is to be determined. The seal is used to secure a transportation container. The method uses the pre-defined set of feature detection rules to detect and extract an extracted feature image at a specified position on the seal. The method breaks down the extracted feature image of the seal into a 'kn' number of sub-images by forming a 'k' rows x 'n' columns of a grid of the extracted feature image. The method implements the pre-defined set of edge detection rules to extract an edge structure of at least one object in each of the 'kn' number of sub-images. The method generates a set of unique fingerprints by specified steps. The method includes generating a unique fingerprint corresponding to a unique number or a feature based on each extracted edge structure. For the set of unique fingerprints, the method generates a match percentage for the set of unique fingerprints using the pre-trained fingerprint identification model. The match percentage corresponds to a matching proportion between each unique fingerprint generated for the seal being verified and the original fingerprint of the original seal on which the pre-trained fingerprint identification model is trained.

Figure 1:
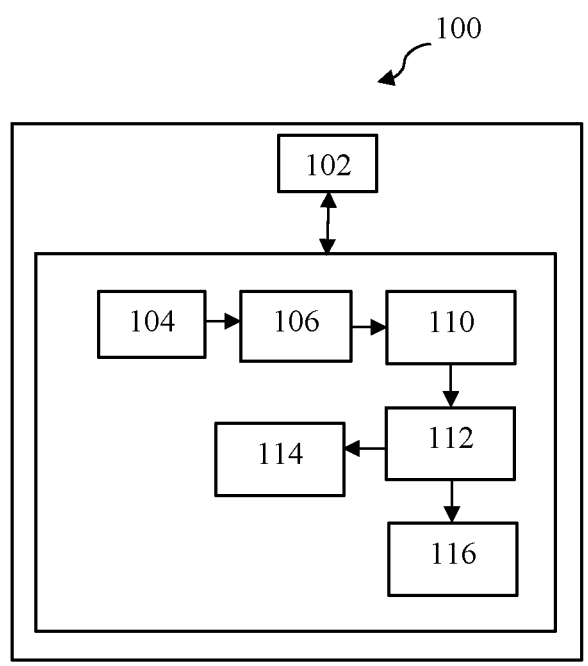
FIG. 1 illustrates an example system for determining the authenticity of a seal, according to some embodiments.

The Figures described above are a representative set and are not exhaustive with respect to embodying the invention.

DESCRIPTION

Disclosed are a system, method, and article of manufacture of determining the authenticity of a seal. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

When an element is referred to as being "mounted on," "engaged to," "connected to" or "coupled to" another element, it may be directly on, engaged, connected, or coupled to the other element.

Terms such as "inner," "outer," "beneath," "below," "lower," "above," "upper" and the like, may be used in the present disclosure to describe relationships between different elements as depicted from the figures.

Definitions

Example definitions for some embodiments are now provided.

Edge detection includes a variety of mathematical methods that aim at identifying points in a digital image at which the image brightness changes sharply or, more formally, has discontinuities. The points at which image brightness changes sharply are typically organized into a set of curved line segments termed edges. The same problem of finding discontinuities in one-dimensional signals is known as step detection and the problem of finding signal discontinuities over time is known as change detection.

Feature is a piece of information about the content of an image; typically about whether a certain region of the image has certain properties. Features may be specific structures in the image such as points, edges, or objects. Features may also be the result of a general neighborhood operation or feature detection applied to the image. Other examples of features are related to motion in image sequences, or to shapes defined in terms of curves or boundaries between different image regions.

Fingerprint (e.g. e-Fingerprint, etc.) can be a set of uniquely identifying data.

Machine learning can include the construction and study of systems that can learn from data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Optical character recognition or optical character reader (OCR) is the electronic or mechanical conversion of images of typed, handwritten, or printed text into machine-encoded text.

Stock keeping unit (SKU) is a distinct type of item for sale, such as a product or service, and all attributes associated with the item type that distinguish it from other item types.

Example Systems and Methods

FIG. 1 illustrates an example system 100 for determining the authenticity of a seal, according to some embodiments. System 100 may comprise a repository 102, a feature detection module 104, an image analyzer 106, an extraction module 110, a fingerprint generation module 112, a fingerprint matching module 114 and an authentication module 116. The repository 102 may be configured to store a pre-defined set of feature detection rules, a pre-defined set of edge detection rules, a pre-defined threshold percentage, and a pre-trained fingerprint identification model.

The feature detection module 104 may be configured to scan a seal whose authenticity is to be determined/verified, and may be further configured to cooperate with the repository 102 to use the pre-defined set of feature detection rules to detect at least one feature at a certain position on the seal. The feature may be a unique serial number assigned to the seal, a batch number/ID of the seal, or any other code or number printed on the packaging of the seal. The feature detection rules may define the position of the feature with reference to an edge of the seal or an article which is secured using the seal or an artwork printed on the article.

Figure 2:
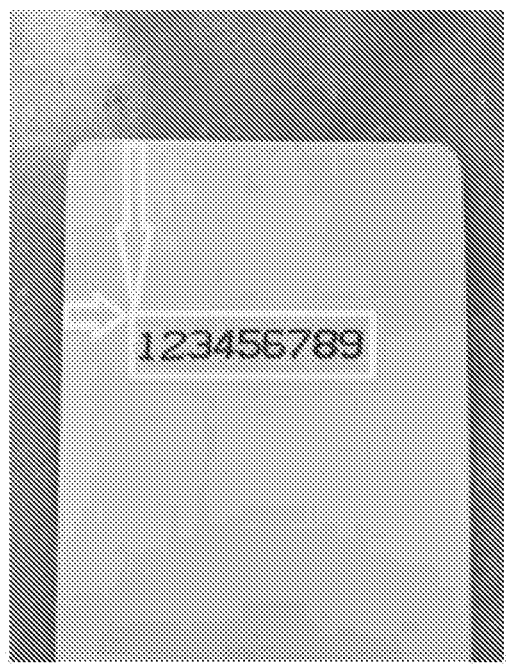
FIG. 2 illustrates the edge of the seal is used to define the position where the feature or serial number for creation of e-Fingerprint is expected to be, according to some embodiments.

In an example, referring to FIG. 2 illustrates the edge of the seal is used to define the position where the feature or serial number for creation of e-Fingerprint is expected to be, according to some embodiments. The feature detection module 104 may be further configured to extract the image of the detected feature or serial number. In an embodiment, the feature detection module 104 may use an independent camera or a smartphone camera for scanning the seal and extracting the feature image.

The image analyzer 106 may be configured to receive the image of the extracted feature from the feature detection module 104, and may be further configured to break down the extracted feature image of the seal into a 'kn' number by forming a 'k' rows x 'n' columns grid. The higher the number of images, the better is the accuracy of authentication, as it helps, inter alia:

To build in redundancy. In case a portion of the packaging or seal is damaged in transit, there is still sufficient information to match the Fingerprint to the original with a reasonable amount of confidence; and The higher the number of smaller images, the better the resolution.

This results in higher accuracy of the machine learning model to create a fingerprint. In an embodiment, the image analyzer 106 is located on the edge device (e.g. in the device which is used to scan the seal (e.g. smartphone)) and/or in a cloud-computing system. In another embodiment, the image analyzer 106 may be a camera based 1D or 2D code reader (liner barcode or datamatrix or QR code reader etc.) to identify the product from its barcode instead of using image recognition to recognize the artwork.

In another embodiment, the image analyzer 106 is located on a remote device such as a remote server or a cloud and the independent camera or smartphone may extract and send the feature image to the image analyzer 106 for processing.

The extraction module 110 may be configured to cooperate with the repository 102 and the image analyzer 106 to implement the pre-defined set of edge detection rules to extract a structure of at least one objects in each of the 'kn' images since the printing differences are most pronounced along the edges. In an embodiment, the system 100 may include a converter to convert the images to grayscale before the extraction module 110 implements the edge detection, to increase the contrast before edge detection, and thereby increase the edge detection accuracy.

The fingerprint generation module 112 may be configured to cooperate with the repository 102 to generate a unique fingerprint (e.g. e-fingerprint, etc.) corresponding to the unique number or feature based on the extracted structures.

Figure 4A:
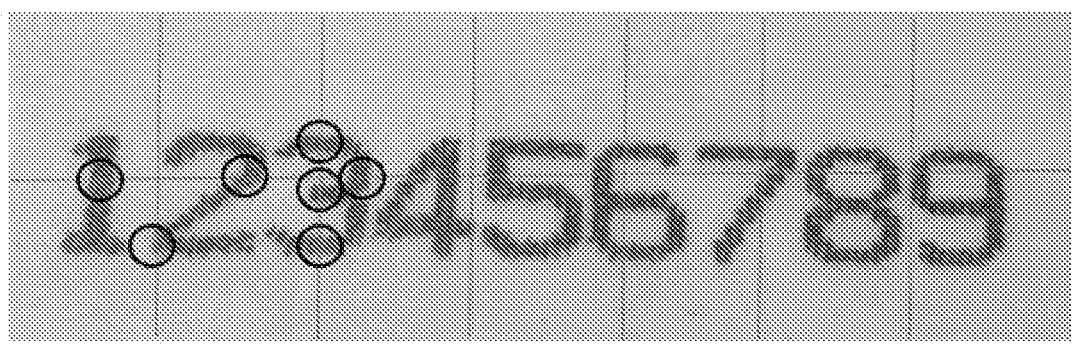
FIGS. 4a and 4b illustrate fourteen (14) unique numbers received from a seven by two (7×2) grid procured from fourteen (14) smaller images, according to some embodiments.
Figure 4B:
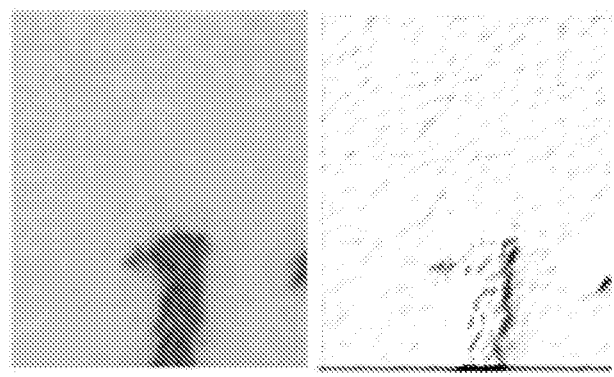

For example, referring to FIGS. 4a and 4b illustrate fourteen (14) unique numbers received from a 7×2 grid procured from 14 smaller images, according to some embodiments. In an embodiment, the fingerprint module 112 may generate 14 e-fingerprints for the 14 smaller images. The fingerprint generation module 112 may be further configured to combine the 14 fingerprints using a mathematical function into one single number.

In another embodiment, these 14 fingerprints can be used independently. The fingerprint matching module 114 may be configured to generate a match percentage for the generated fingerprint(s) using the fingerprint identification model. The match percentage may correspond to a matching proportion between the fingerprint(s) generated for the seal to be verified and the fingerprint of the original seal using which the model is trained. The fingerprint matching module 114 may be further configured to compare the match percentage with the threshold percentage to generate either one of (i) a first notification if the matching percentage is greater than or equal to the threshold percentage and (ii) a second notification if the matching percentage is less than the threshold percentage. The generated notification may be displayed on a display screen of an electronic device.

In an embodiment, the threshold percentage may vary depending on the article being verified and may be defined by a user. Optionally, the repository 102 may include a pre-trained product identification model.

The system 100 may use the pretrained product identification model to identify a product based on an artwork printed on the product packaging, a text in and around a visual code printed on the packaging, a brand logo, or a relative position and size of the visual code and the artwork, text, or brand logo printed on the packaging. If a product is successfully identified, the feature detection module 104 may be triggered to detect and extract the feature image for generation of the Fingerprint.

In an alternate embodiment, at the production line, the feature detection module 104 may be used to detect the position of feature on each of the original artwork printed on the items. The feature detection module 104 may capture the images of the detected features and send the captured images to image analyzer 106. The image analyzer 106 may be used to plot a grid on the feature images to break them into smaller images as shown in FIG. 4a. In this embodiment, the extraction module 110 may be configured to calculate the number and positions or coordinates of intersections of each value of the feature with the grid in each of the smaller images. In another embodiment, the image analyzer 106 may be configured to plot a different pattern instead of a grid. The grid is only for representative purpose and any other design could be used to identify the unique pattern. The higher the resolution of the grid or pattern, the higher will be the accuracy of the fingerprint.

The repository 102 may be configured to cooperate with the feature detection module 104 and the extraction module 110 store a list of unique serial numbers and/or batch IDs of the original seals or products, the detected positions of one or more features of the original seals corresponding to said numbers/IDs, and the calculated number and positions of intersections of values of features with respect to grid. This stored information may be used to identify the genuineness of a seal to be verified. In an exemplary embodiment, the feature detection module 104 may be used to detect the position of a feature on a seal to be verified (e.g. a test seal) and may be further configured to identify the unique serial no. or batch ID printed on the seal.

An authentication module 116 may be configured to cooperate with the repository (102) to extract the position of feature corresponding to the original seal with the identified serial no./ID. The authentication module 116 may be further configured to compare the detected position of the test seal with the extracted position of the original seal to determine the genuineness of the test seal.

Additionally or optionally, the image analyzer 106 may be configured to receive the feature image of the test seal from the feature detection module 104 and may be further configured to plot a grid of pre-defined rows and columns on the received image to form smaller images as shown in FIG. 4a. The extraction module 110 may be configured to calculate the number and positions of intersections of each value of the feature of the test seal with the grid in each of the smaller images. For example, as shown in FIG. 4a, the value '1' of feature (e.g. unique serial number) of a seal intersects with the grid at one location only. Similarly, the value '2' of the feature intersects with the grid at two locations.

The authentication module 116 may be configured to cooperate with the extraction module 110 and the repository 102 to find a match between the calculated number and positions of intersections for the test seal and prestored number and positions of intersections for the original seals. If a match is found, the seal can be designated as genuine else the seal can be declared as fake. Alternatively, the authentication module 116 may identify the serial number or batch ID of the seal using OCR, and compare the calculated number and positions of values of features of the test seal with the pre-stored number and positions for original seal(s) having said serial number or batch ID to determine the genuineness of the test seal.

In an embodiment, the authentication module 116 may use OCR to detect and identify text that may be printed such as a unique alpha-numeric code or a batch number on the packaging. In another embodiment, the authentication module 116 may also use a 1D or 2D code reader such as a barcode or a QR code reader to identify a batch or unique product identification. In this way, each batch will have a limited number of Fingerprints (depending on the batch size). No two batches will have the same Fingerprint since the printed batch number will change. If a unique code is printed on each pack, then there can only be one universally unique Fingerprint for the pack. In case of a unique code, an additional feature is the system 100 may also be configured to allow for a certain number of mismatches before a product is declared as a fake.

The system 100 may use OCR and a combination of the batch code and the unique code to efficiently identify and locate the original fingerprint from the repository 102 for comparison. It is noted that using OCR to read the batch/unique number can make the search for the fingerprint in the database faster since now it knows not only the product (e.g. from the artwork/barcode) but also which batch. This can then be used to narrow down the search.

In an embodiment, referring to FIG. 5a to 5d (e.g. instead of position and number of intersections) the extraction module 110 may be configured to extract a new pattern from the intersection points between the grid/pattern and the artwork. The new pattern can then be used to generate a Fingerprint, using techniques and methods such as image recognition, machine learning and the like to resolve into a unique Fingerprint. The system 100 may thus determine the authenticity of a seal by distinguishing an original seal from the duplicate seals.

Figure 3B:
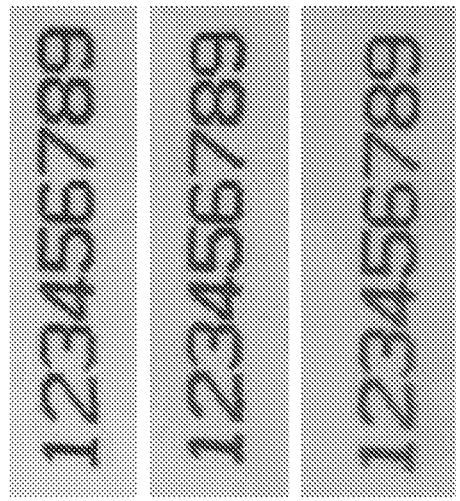
FIGS. 3a and 3b illustrate examples of seals printed with the same serial number as the original may have minor printing differences, according to some embodiments.
Figure 3A:

As shown in FIGS. 3a and 3b illustrate examples of seals printed with the same serial number as the original may have minor printing differences, according to some embodiments. The system 100 may identify these minor differences to check whether a seal is an original seal or a duplicate seal. The feature detection module 104, the image analyzer 106, the extraction module 110, the fingerprint generation module 112, the fingerprint matching module 114 and the authentication module 116 are implemented using one or more processor(s). The processor may be implemented as one or more microprocessors, microcomputers, microcontrollers, digital signal processors, central processing units, state machines, logic circuitries, and/or any device that manipulates signals based on operational instructions. Among other capabilities, the processor may be configured to fetch and execute the set of predetermined rules stored in the memory to control the operation of different modules/units of the system.

Accordingly, example methods determine the authenticity of a seal. The example methods can several technical advantages including, inter alia:

uses Machine Learning (ML) techniques to train a model for checking the authenticity of a seal; and can detect minor differences in printing of a unique serial number to differentiate between an original seal and a fake seal.

Machine Learning

As noted supra, image analyzer 106 can utilize machine learning algorithms to recommend and/or optimize creation of a fingerprint. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consists of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (e.g. in cross-validation), the test dataset is also called a holdout dataset.

Figure 6:
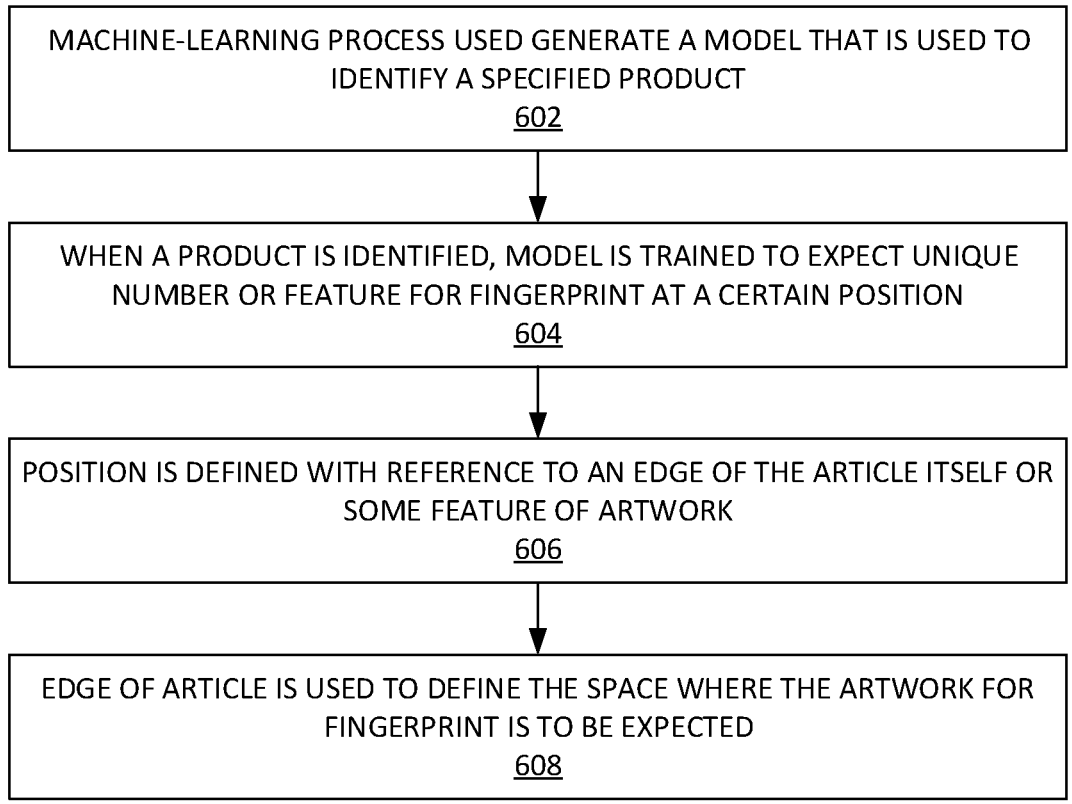
FIG. 6 illustrates an example machine learning process for recommendation and/or optimization creation of a fingerprint, according to some embodiments.

FIG. 6 illustrates an example machine-learning process 600 for recommendation and/or optimization creation of a fingerprint, according to some embodiments. Machine-learning process 600 can be used to generate a model that is used to identify a specified product in step 602. In step 604, when a product is identified, the model is trained to expect the unique number or feature for the e-Fingerprint (e.g. the fingerprint) at a certain position. In step 606, this position is defined with reference to an edge of the article itself or some feature of the artwork. In step 608, the edge of the article is used to define the space where the artwork for the e-Fingerprint is expected to be. Machine-learning process 600 can be implemented, inter alia, by image analyzer 106.

Additional Example Methods

Figure 7:
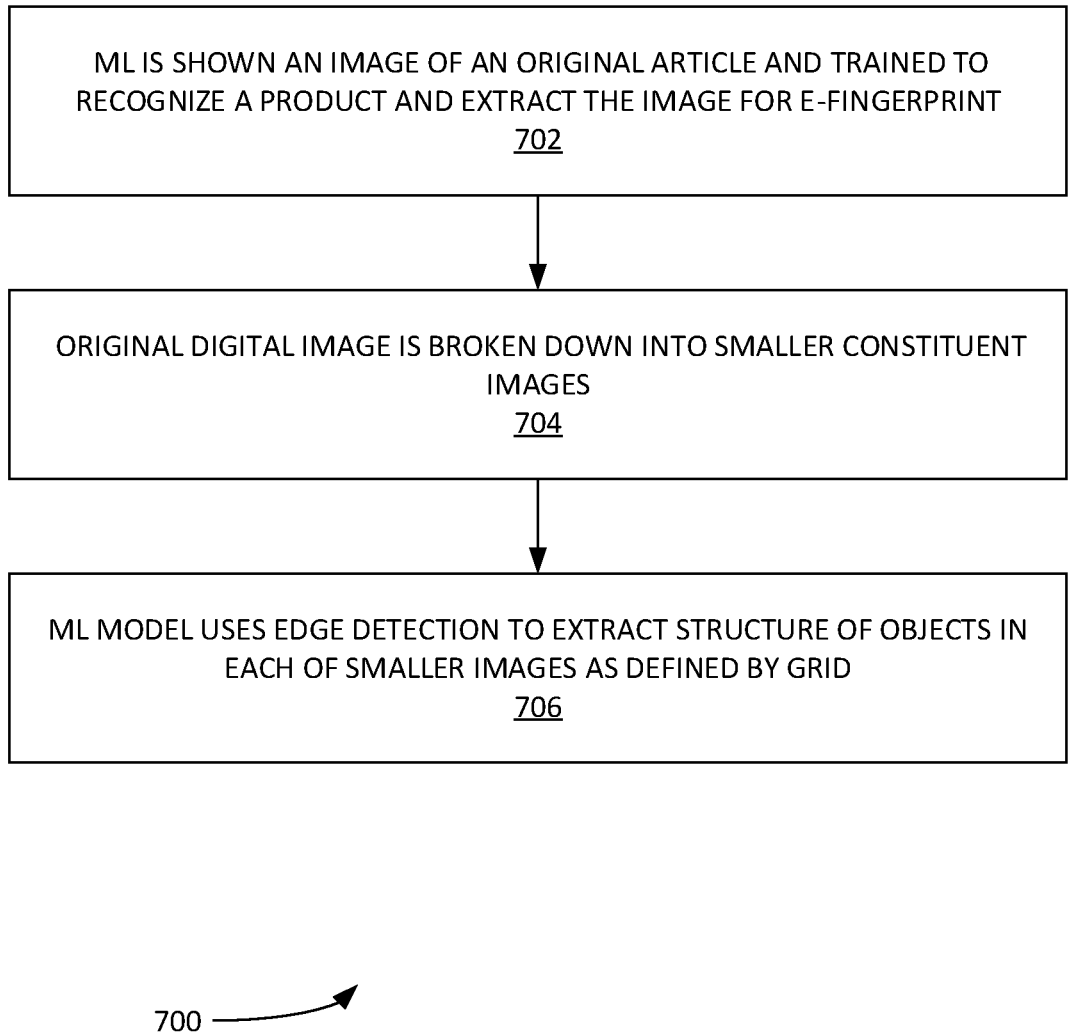
FIG. 7 illustrates an example process for an anti-counterfeiting solution using an ML model, according to some embodiments.

FIG. 7 illustrates an example process 700 for anti-counterfeiting solution using an ML model, according to some embodiments. It is noted that the ML model of process 700 can be built, trained, and tested utilizing the methodologies discussed supra.

In step 702, an ML model is shown an image of an original article. In one embodiment, the model can be trained to recognize a product and further trained to extract the image for the e-Fingerprint. In another embodiment, the model can be given the digital image that is used to resolve into an e-Fingerprint.

In step 704, the original digital image is broken down into smaller constituent images (e.g. as shown in FIG. 4A, etc.). In one example, a 7×2 grid is used to break the original image into fourteen (14) smaller images. It is noted that other configurations can be used as well. The higher the number of images can increase accuracy of the results/output. Step 704 can be used to build in redundancy. In case a portion of the packaging or seal is damaged in transit, there can still be sufficient information to match the e-Fingerprint to the original with a reasonable amount of confidence. Also, the higher the number of the smaller images, the better the resolution. This results in higher accuracy of the ML model to create an e-Fingerprint.

In step 706, the ML model can use edge detection to extract the structure of the objects in each of the smaller images as defined by the grid. Since the printing differences are most pronounced along the edges, this is where we have the most information needed to differentiate between two copies. FIG. 4B illustrates an example of a smaller image.

Figure 8:
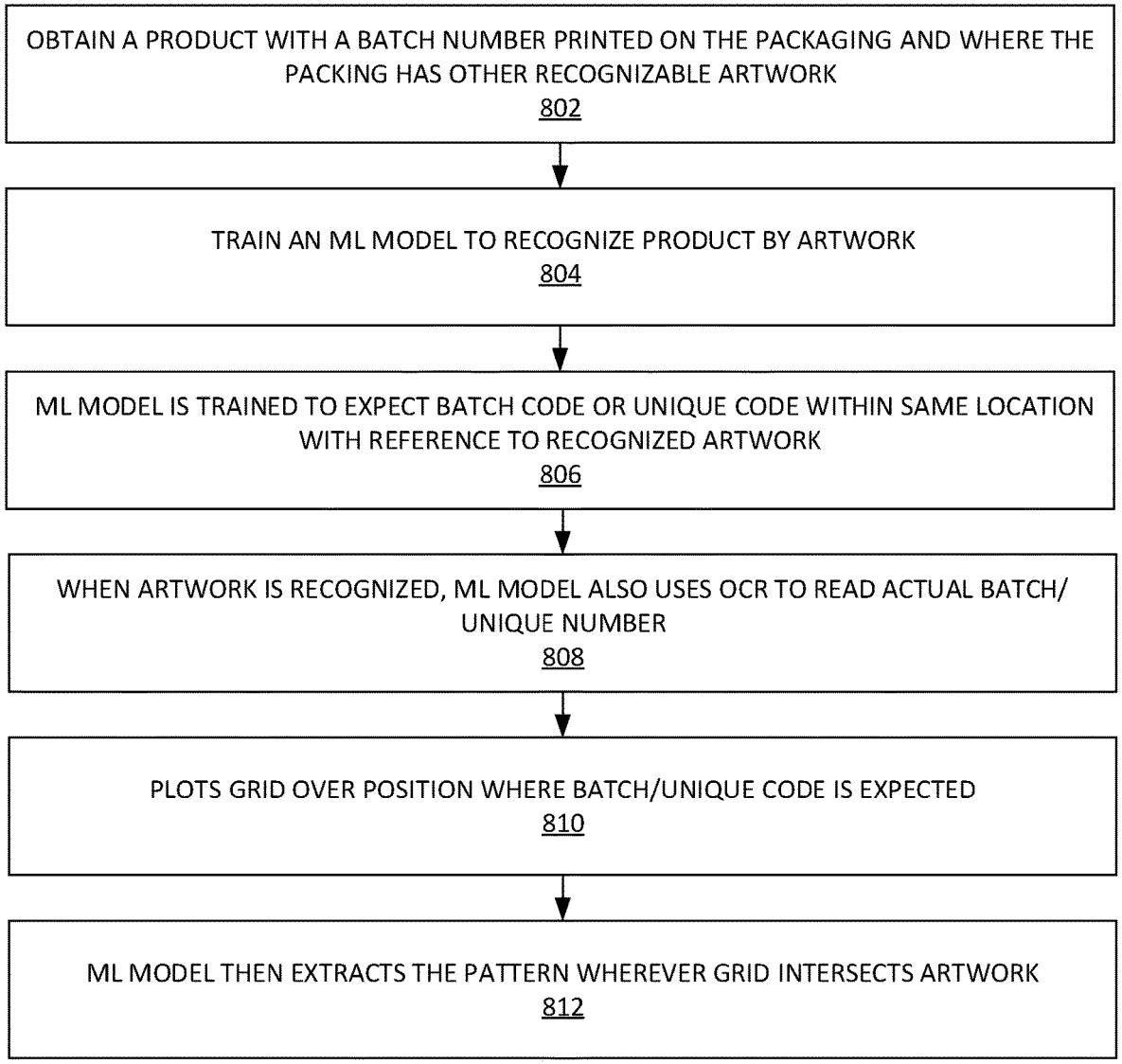
FIG. 8 illustrates an example process for another anti-counterfeiting solution, according to some embodiments.

FIG. 8 illustrates an example process for another anti-counterfeiting solution, according to some embodiments. Process 800 also uses an ML model that can be built, trained, and tested utilizing the methodologies discussed supra. In step 802, a product is obtained that has a batch number printed in an alpha-numeric form on its packaging. A unique alpha-numeric code may also be printed at this location in addition to the batch code. This printing is usually around some other recognizable artwork.

In step 804, process 800 trains an ML model to recognize the product by the artwork (e.g. a logo as shown in FIGS. 5A-D, etc.).

In step 806, the ML model is also trained to expect the batch code or unique code within the same location with reference to the recognized artwork. For example, in (e.g. a logo as shown in FIGS. 5A-D, a digital image of this is shown. This expected location can be the darker portion on the card and the recognizable artwork is the logo. The batch number is expected to be at this location.

In step 808, when the artwork is recognized, the ML model also uses OCR to read the actual batch/unique number.

Figure 5A:
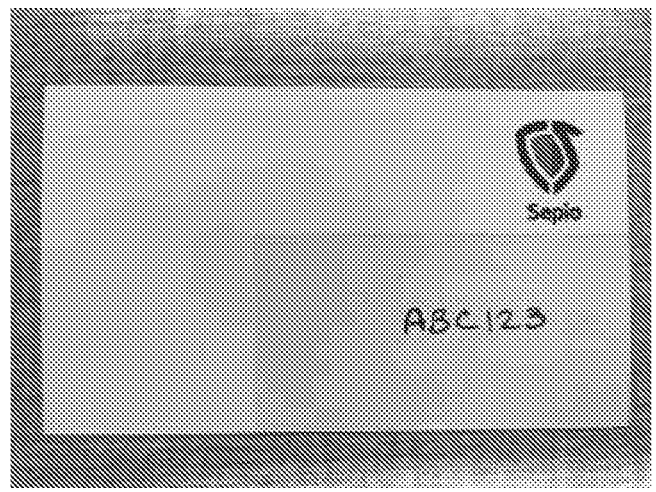
FIGS. 5a to 5d illustrate that the extraction module can be configured to extract a new pattern from the intersection points between the grid/pattern and the artwork, according to some embodiments.
Figure 5B:
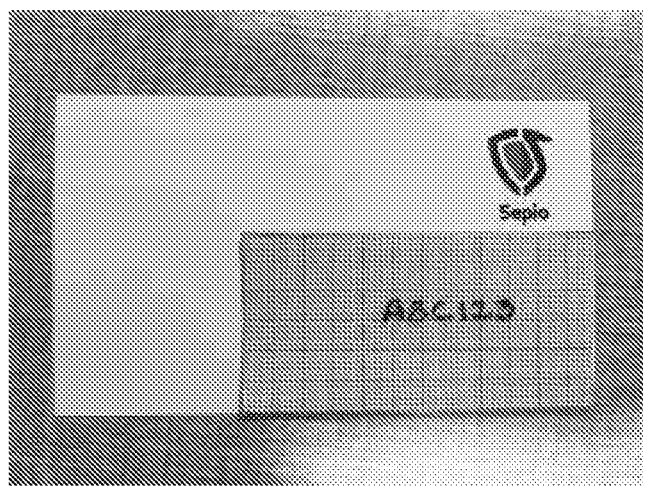

In step 810, process 800 then plots a grid over the position where the batch/unique code is expected (e.g. see FIG. 5B). This grid can be set in a fixed position with reference to the artwork recognized.

Figure 5C:
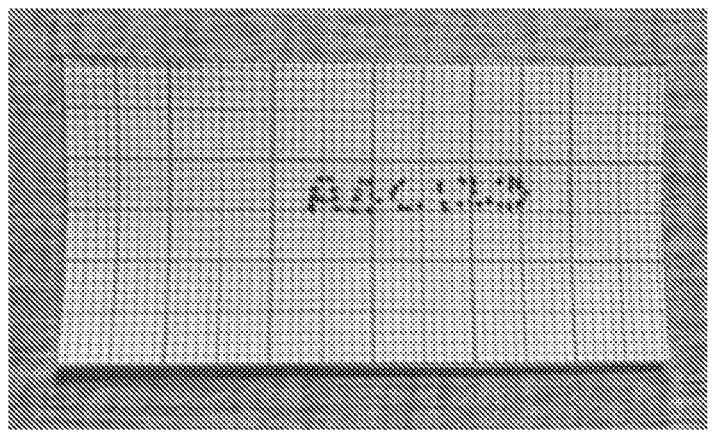
Figure 5D:
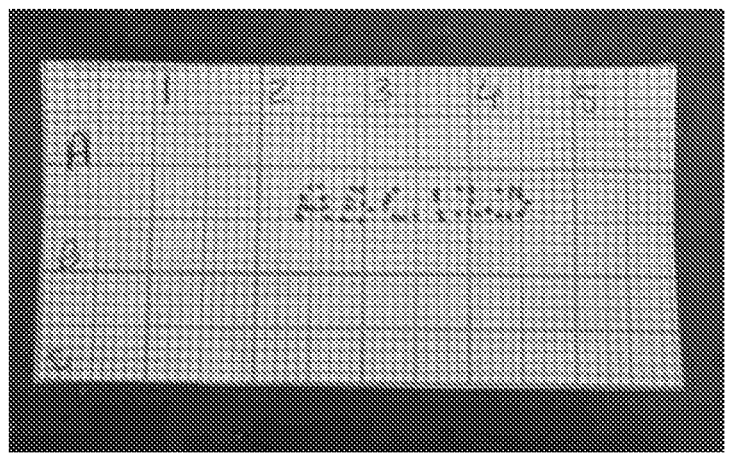

In step 812, the ML model then extracts the pattern wherever the grid intersects the artwork (e.g. see FIG. 5C). This pattern is then resolved into a relative position (e.g. see FIG. 5D).

In another embodiment of process 800, any other logic can be used to extract the e-Fingerprint of the text with reference to the grid. It is expected that each subsequent unit within a batch itself can also have a unique fingerprint. So, if a batch has ten thousand (10,000) units, there will be 10,000 unique fingerprints.

In another embodiment, process 800 can print a unique code per SKU in addition to the batch code. The ML model can use OCR to create a schema for the batch code and identify the unique code as well. Within the batch there can be only one fingerprint possible per unit universally. Process 800 can combine the batch with a random code. Accordingly, when each batch is combined with the unique code, it can form a universally unique combination. Thus, the length of the random code need be only as big as a batch size. For example, if a production batch has 10,000 units, the random code needs to be no longer than five (5) characters long.

Figure 9:
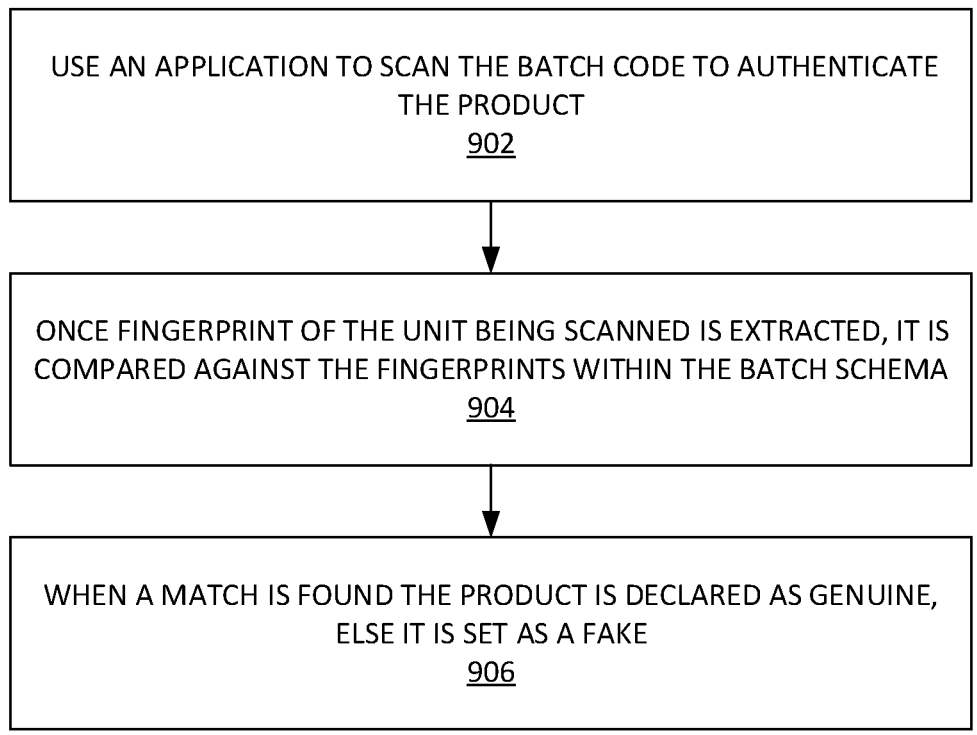
FIG. 9 illustrates an example process for authentication, according to some embodiments.

FIG. 9 illustrates an example process 900 for authentication, according to some embodiments. In step 902, the user can use an application (e.g. in a mobile device) to scan the batch code to authenticate the product. The application can follow the same in the processes provided supra (e.g. recognize the logo/artwork; use OCR to read the batch and/or unique code to find the schema and/or original fingerprint pattern/number/etc.; plot the grid at a fixed pre-defined position relative to the artwork; extract the intersection points; calculate the fingerprint; etc.).

In step 904, once the fingerprint of the unit being scanned is extracted, it is compared against the fingerprints within the batch schema (e.g. if there is no unique code). If there is a unique code, it is compared against the original fingerprint of that specific item.

In step 906, when a match is found the product is declared as genuine, else it is set as a fake. Process 900 can be used in conjunction/parallel with a process to obtain a more accurate double-checked result.

Additional Example Computing Systems

Figure 10:
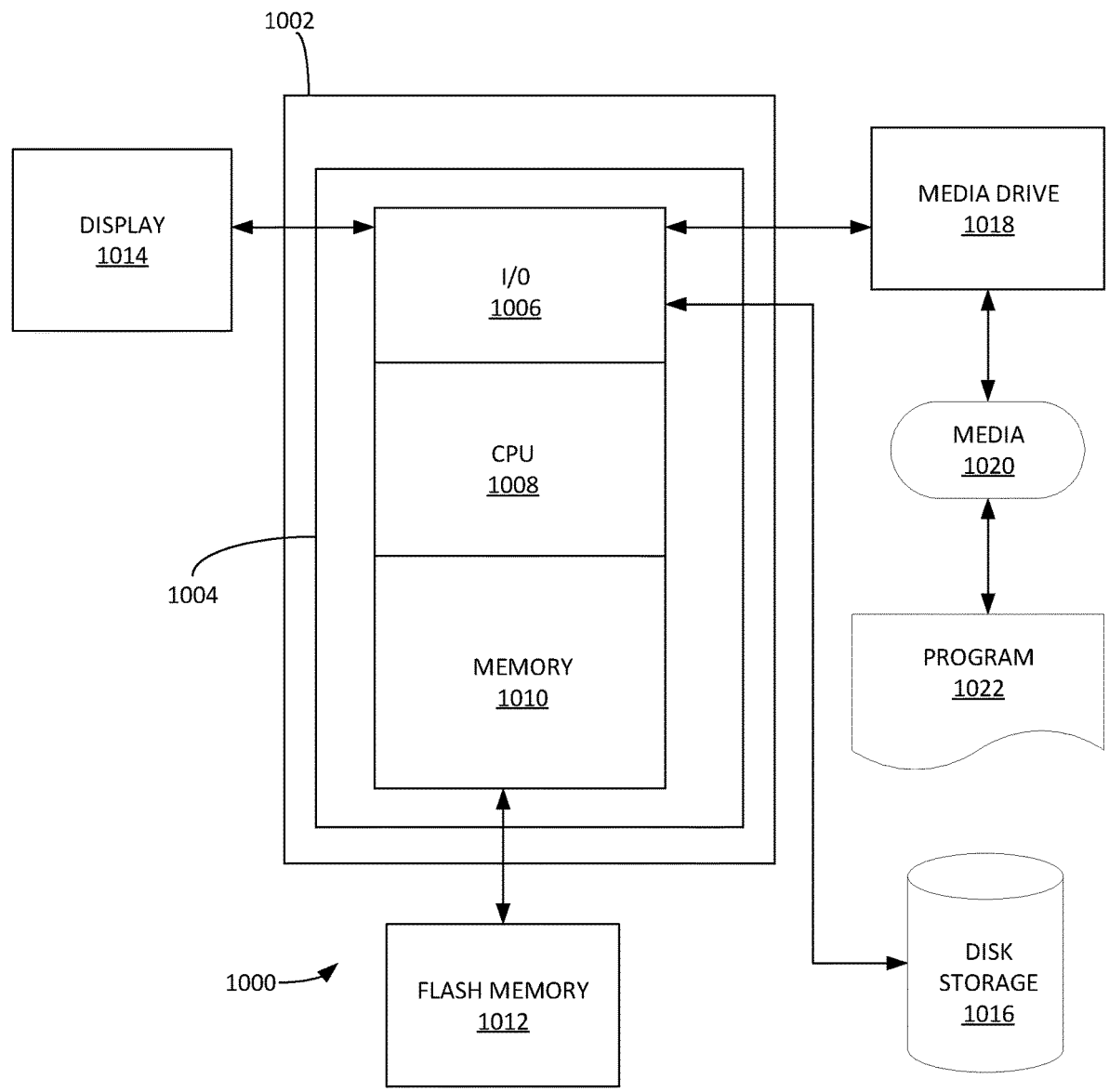
FIG. 10 is a block diagram of a sample computing environment that can be utilized to implement various embodiments.

FIG. 10 depicts an exemplary computing system 1000 that can be configured to perform any one of the processes provided herein. In this context, computing system 1000 may include, for example, a processor, memory, storage, and I/O devices (e.g., monitor, keyboard, disk drive, Internet connection, etc.). However, computing system 1000 may include circuitry or other specialized hardware for carrying out some or all aspects of the processes. In some operational settings, computing system 1000 may be configured as a system that includes one or more units, each of which is configured to carry out some aspects of the processes either in software, hardware, or some combination thereof.

FIG. 10 depicts computing system 1000 with a number of components that may be used to perform any of the processes described herein. The main system 1002 includes a motherboard 1004 having an I/O section 1006, one or more central processing units (CPU) 1008, and a memory section 1010, which may have a flash memory card 1012 related to it. The I/O section 1006 can be connected to a display 1014, a keyboard and/or other user input (not shown), a disk storage unit 1016, and a media drive unit 1018. The media drive unit 1018 can read/write a computer-readable medium 1020, which can contain programs 1022 and/or data. Computing system 1000 can include a web browser. Moreover, it is noted that computing system 1000 can be configured to include additional systems in order to fulfill various functionalities. Computing system 1000 can communicate with other computing devices based on various computer communication protocols such a LoRaWAN, Wi-Fi, Bluetooth® (and/or other standards for exchanging data over short distances includes those using short-wavelength radio transmissions), USB, Ethernet, cellular, an ultrasonic local area communication protocol, etc.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A computerized method for anti-counterfeiting solution using a machine learning (ML) model, comprising:
   providing a pre-defined set of feature detection rules, a pre-defined set of edge detection rules, a pre-defined threshold percentage, an original seal, an original fingerprint of the original seal, and a pre-trained fingerprint identification model, wherein the pre-trained fingerprint identification model is trained by a specified ML algorithm using one or more digital images of the original seal;
   with a digital camera of a scanning device, scanning a seal whose authenticity is to be determined, wherein the seal is used to secure a transportation container;
   using the pre-defined set of feature detection rules to detect and extract an extracted feature image at a specified position on the seal;
   breaking down the extracted feature image of the seal into a 'kn' number of sub-images by forming a 'k' rows x 'n' columns of a grid of the extracted feature image;
   implementing the pre-defined set of edge detection rules to extract an edge structure of at least one object in each of the 'kn' number of sub-images;
   generating a set of unique fingerprints by:
      generating a unique fingerprint corresponding to a unique number or a feature based on each extracted edge structure; and
   for the set of unique fingerprints, generating a match percentage for the set of unique fingerprints using the pre-trained fingerprint identification model, wherein the match percentage corresponds to a matching proportion between each unique fingerprint generated for the seal being verified and the original fingerprint of the original seal on which the pre-trained fingerprint identification model is trained.

2. The computerized method of claim 1 further comprising:
   determining that the match percentage is within the pre-defined threshold percentage.

3. The computerized method of claim 1, wherein the seal is declared as genuine when the match percentage is within the pre-defined threshold percentage.

4. The computerized method of claim 1, wherein the seal comprises a plastic seal used to mechanically secure the transportation container.

5. The computerized method of claim 4, wherein the transportation container comprises a sealed transport box, a seal shipping containers, or a sealed vehicle door.

6. The computerized method of claim 1, wherein the 'kn' images are located along the edges of the extracted feature image.

7. The computerized method of claim 1, wherein a notification is displayed on the scanning device when the matching percentage is greater than or equal to the specified threshold.

8. The computerized method of claim 7, wherein the threshold percentage varies based on the seal being verified.

9. The computerized method of claim 1 further comprising:
   using the pre-defined set of feature detection rules to detect at least one feature at a certain position on the seal.

10. The computerized method of claim 9, wherein the feature comprises a unique serial number assigned to the seal or a batch number of the seal.

11. The computerized method of claim 10, wherein the feature detection rules define the position of the feature with a reference to an edge of the seal or an article which is secured using the seal or an artwork printed on the article.

12. The computerized method of claim 11, wherein the edge of the seal is used to define a position where the feature or a serial number for a creation of the unique fingerprint.

13. The computerized method of claim 12, wherein an optical character recognition (OCR) functionality reads the unique number.

14. A computerized method for anti-counterfeiting solution using a machine learning (ML) model, comprising:
   providing a pre-defined set of feature detection rules, a pre-defined threshold percentage, an original product image, an original fingerprint of the original product image, and a pre-trained fingerprint identification model, wherein the pre-trained fingerprint identification model is trained by a specified ML algorithm using one or more digital images of the original product image;
   with a digital camera of a scanning device, scanning a product image whose authenticity is to be determined;
   breaking down the extracted feature image of the seal into a 'kn' number of sub-images by forming a 'k' rows x 'n' columns of a grid of the extracted feature image;
   implementing the pre-defined set of detection rules to extract a structure of at least one object in each of the 'kn' number of sub-images;
   using the pre-defined set of feature detection rules to detect and extract an extracted feature image at a specified position on the product image;
   generating a set of unique fingerprints by:
      generating a unique fingerprint corresponding to a unique number or a feature based on the extracted feature image or a feature based on each extracted structure; and
   for the set of unique fingerprints, generating a match percentage for the set of unique fingerprints using the pre-trained fingerprint identification model, wherein the match percentage corresponds to a matching proportion between each unique fingerprint generated for the product image being verified and the original fingerprint of the original product image on which the pre-trained fingerprint identification model is trained.

15. The computerized method of claim 14, wherein the product image is used to secure a transportation container.

16. The computerized method of claim 15, further comprising:

increasing a number of the sub-images and decreasing a size of sub-images to improve a resolution of the grid of the extracted feature image.

* * * * *